United States Patent [19]
Coutant et al.

[11] Patent Number: 5,916,050
[45] Date of Patent: Jun. 29, 1999

[54] ELECTRO-MECHANICAL TRANSMISSION

[75] Inventors: Alan R. Coutant, Chillicothe; Stephen C. Garnett, Princeville; Eric D. Stemler, Peoria, all of Ill.

[73] Assignee: Caterpillar Inc., Peoria, Ill.

[21] Appl. No.: 08/905,665

[22] Filed: Aug. 4, 1997

[51] Int. Cl.⁶ .................................................. F16H 47/04
[52] U.S. Cl. ............................................. 475/5; 475/8
[58] Field of Search ....................... 477/2, 3, 8; 475/2, 475/5, 6

[56] References Cited

U.S. PATENT DOCUMENTS

| | | |
|---|---|---|
| 3,503,281 | 3/1970 | Gsching et al. |
| 3,823,620 | 7/1974 | Bricout. |
| 5,558,588 | 9/1996 | Schmidt ........................................ 475/5 |
| 5,558,589 | 9/1996 | Schmidt ........................................ 475/5 |
| 5,571,058 | 11/1996 | Schmidt ........................................ 475/5 |
| 5,577,973 | 11/1996 | Schmidt ........................................ 475/5 |
| 5,603,671 | 2/1997 | Schmidt ........................................ 475/5 |

FOREIGN PATENT DOCUMENTS

19751993  5/1998  Germany ................... F16H 47/04

*Primary Examiner*—Khol Q. Ta
*Attorney, Agent, or Firm*—John W. Morrison; C. E. Glastetter

[57] ABSTRACT

A electro-mechanical transmission includes an electrical section and a mechanical transmission to provide an infinitely adjustable power flow through the transmission. The mechanical transmission includes a planetary gearing mechanism having three planetary gear sets and five members which interact with the electrical section and a gear change mechanism to infinitely adjust output speed.

8 Claims, 7 Drawing Sheets

ELECTRO-MECHANICAL TRANSMISSION

TECHNICAL FIELD

This invention relates generally to an electro-mechanical transmission and more particularly to a planetary gearing mechanism having five members and three planetary gear sets.

BACKGROUND ART

In a machine, such as a wheel loader or a track type tractor, for example, an engine supplies power for propelling the machine in the forward or reverse directions as well as supply power for machine implements. A transmission is coupled to the engine and transmits power from the engine to the drive train to propel the machine. It is desirable to utilize a continuously variable transmission and manage the transmission ratio to hereby save engine power for the implements and also to provide a continuously variable power flow through the transmission to improve machine productivity. Because machines operate at relatively low speeds and in cyclical work routines, there is a need to control speed precisely and to be infinitely adjustable throughout the full range of the transmission. One of the problems associated with such an arrangement is to provide an electro-mechanical transmission that will operate at high efficiencies over a wide variety of operating conditions.

The present invention is directed to overcoming one or more of the problems as set forth above.

DISCLOSURE OF THE INVENTION

In one aspect of the present invention a electro-mechanical having a input and a output is provided. The electro-mechanical includes a first and a second motor/generator and a planetary gearing mechanism. A first member of the planetary gearing mechanism is connected to one of the motor/generator. A second member of the planetary gearing mechanism is selectively connected to the output. A third member of the planetary gearing mechanism is selectively connected to the output. A fourth member of the planetary gearing mechanism is connected to the input. A fifth member of the planetary gearing mechanism is connected to the other of the motor/generator and is selectively connected to the output.

BEST MODE FOR CARRYING OUT THE INVENTION

Figure 1:
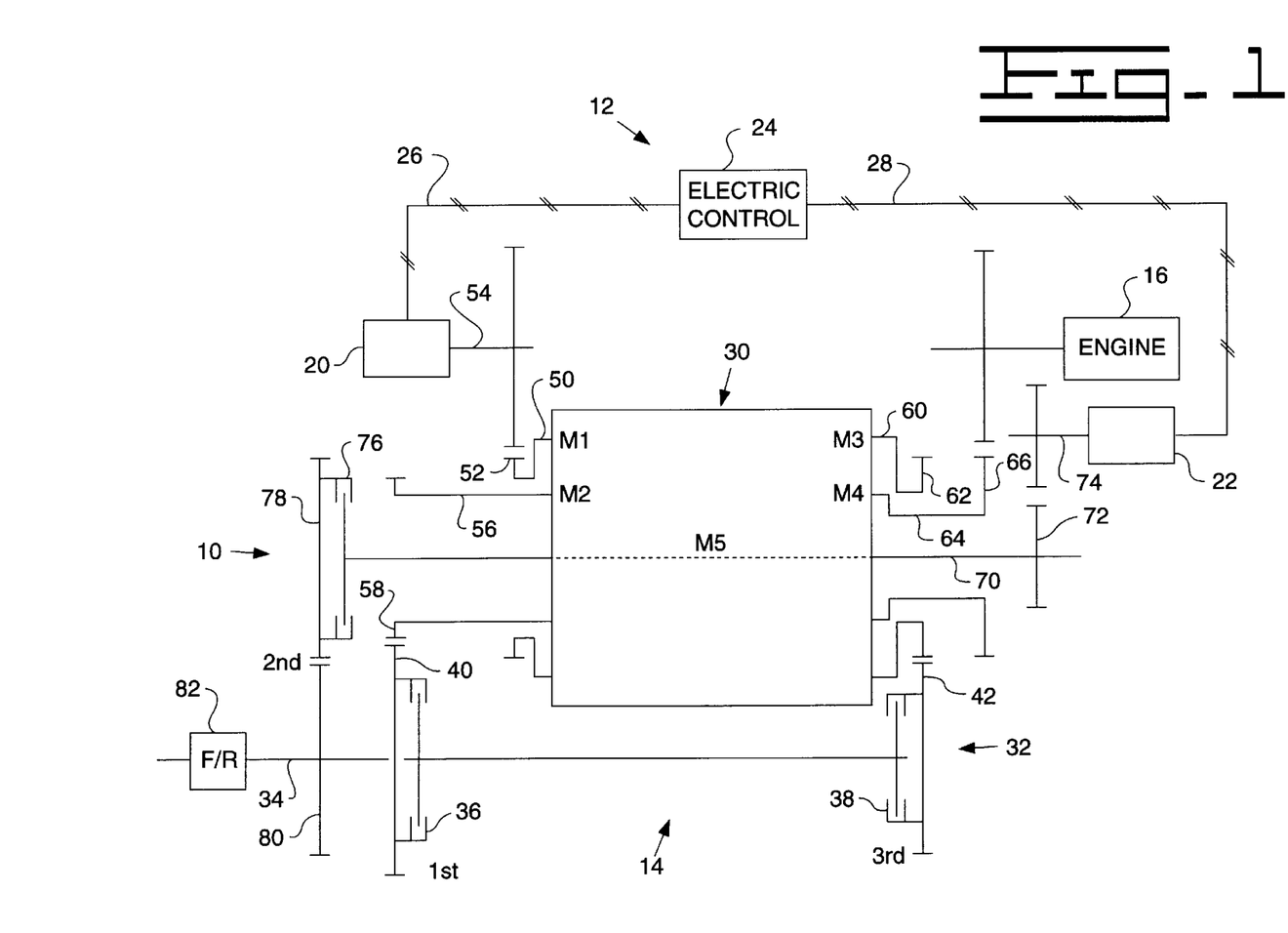
FIG. 1 is a schematic view of a transmission showing the present invention of five members of the planetary arrangement.

Referring to FIG. 1, a electro-mechanical transmission 10 includes a electric section 12 and a mechanical transmission 14 to propel a machine, not shown. The electro-mechanical transmission provides the structure to distribute power from a power source, such as an engine 16, to an output. The electric section 12 includes a first motor/generator 20 connected to the mechanical transmission 14, a second motor/generator 22 connected to the mechanical transmission 14 and a controller 24 electrically connected to the motors/generators 20,22 by cables 26,28. The controller 24 controls the speed and direction of the motors/generators 20,22 and also controls when to change between motor or generator.

The mechanical transmission 14 includes a planetary gearing mechanism 30 and a gear change mechanism 32 having an output shaft 34. The gear change mechanism controls the ratio of the transmission by engaging a first clutch 36 or a second clutch 38 for selectively connecting a respective gear 40,42 to the output shaft 34. A first member 50 of the planetary gearing mechanism 30 includes a gear 52 which is drivingly connected to the output shaft 54 of the first motor/generator 20. A second member 56 of the planetary gearing mechanism 30 includes a gear 58 drivingly connected to the gear 40. A third member 60 of the planetary gearing mechanism 30 includes a gear 62 drivingly connected to the gear 42. A fourth member 64 of the planetary gearing mechanism 30 includes a gear 66 drivingly connected to the engine 16. A fifth member 70 of the planetary gearing mechanism 30 includes a gear 72 which is drivingly connected to the output shaft 74 of the second motor/generator 22. The fifth member 70 is also selectively connected to the output shaft 34 by engagement of a clutch 76 and gears 78,80. The output shaft 34 can be connected to a conventional directional mechanism 82 to allow for machine in a forward or reverse direction. The members 50,56,60,64,70 can each comprise one or more elements of the planetary gearing mechanism 30 and any associated gears which are connected together to function as one member.

Reference numerals of components previously described will be repeated in subsequent drawing figures.

Figure 2:
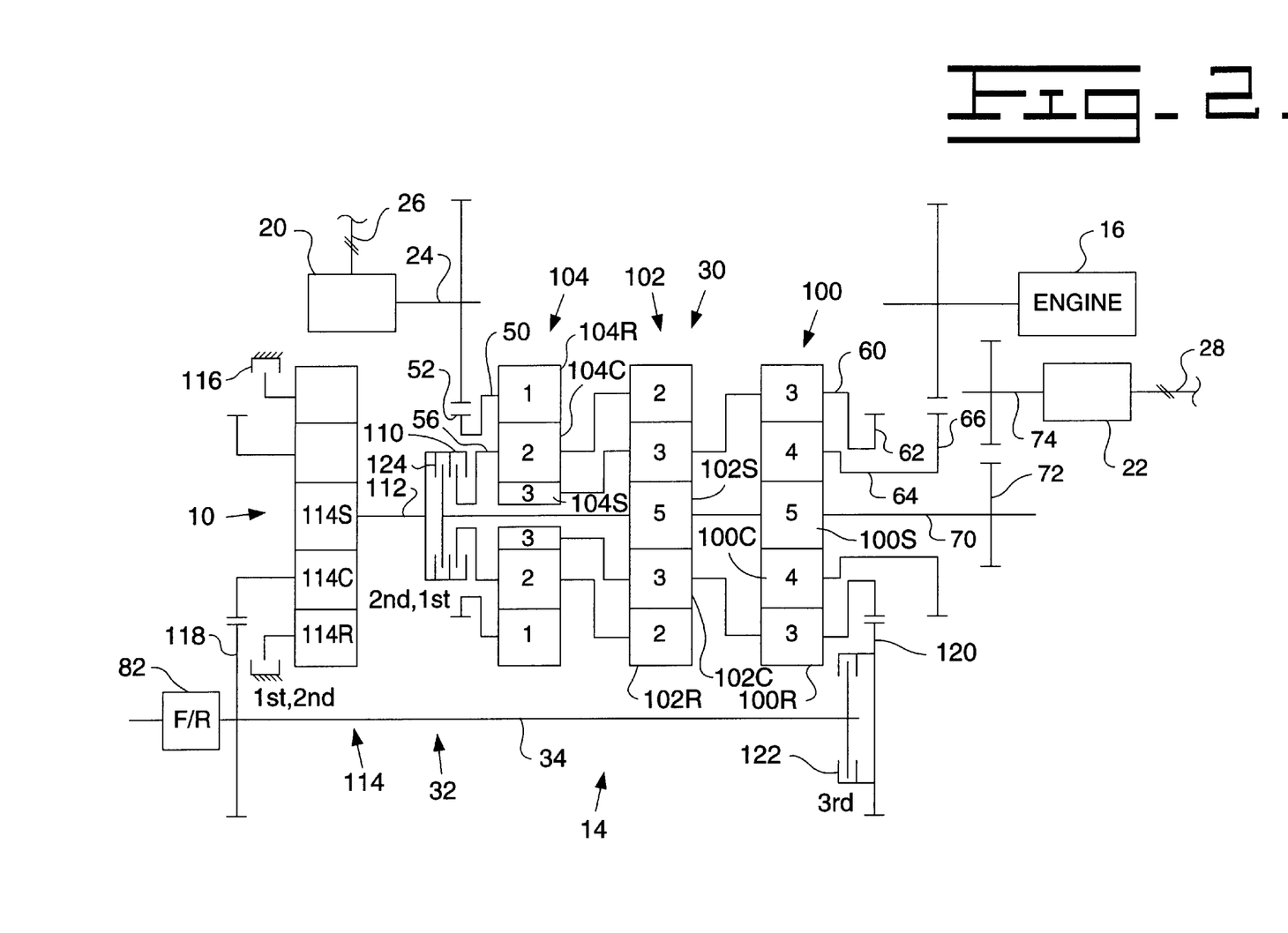
FIG. 2 is a schematic view of a transmission arrangement showing the five members of the three planetaries.

Referring to FIG. 2, the planetary gear mechanism 30 includes a first planetary gear set 100, a second planetary 102 and a third planetary set 104. Each planetary set 100,102,104 includes elements such as a sun gear, a carrier with planet gears, a ring gear. The first planetary gear set 100 includes a sun gear 100S, a carrier 100C and a ring gear 100R. The second planetary gear set 102 includes a sun gear 102S, a carrier 102C and a ring gear 102R. The members 50,56,60,64,70 comprise one or more elements of the planetary gear 100,102,104 which are connected together to function as one member. The first member 50 includes the ring gear 104R and is connected to the first motor/generator 20. The second member 56 includes the carrier 104C, the ring gear 102R and is selectively engageable by a clutch 110, for first gear ratio, for connection to the output shaft 34 through a reduction planetary 114. The second member 56 is connectable to a shaft 112 to drive a sun gear 114S. To achieve first and second gear ratios a clutch 116 is engaged and the carrier 114C drives the gear 118 on the output shaft 34. The third member 60 includes the ring gear 100R, the carrier 102C, the sun gear 104S and includes the gear 62 which is drivingly connected to a gear 120. The gear 120 is selectively connected to the output shaft 34 by a clutch 122 to achieve third gear ratio. The fourth member 64 includes the carrier 100C and is connected, by the gear 66, to the engine 16. The fifth member 70 includes the sun gears 100S,102S and the gear 72 is drivingly connected to shaft of the second motor/generator 22. The fifth member 70 is also selectively connected by a clutch 124 to drive the reduction planetary 114. The gear mechanism 32 includes the clutches 110,124 and the reduction planetary 114.

Figure 3:
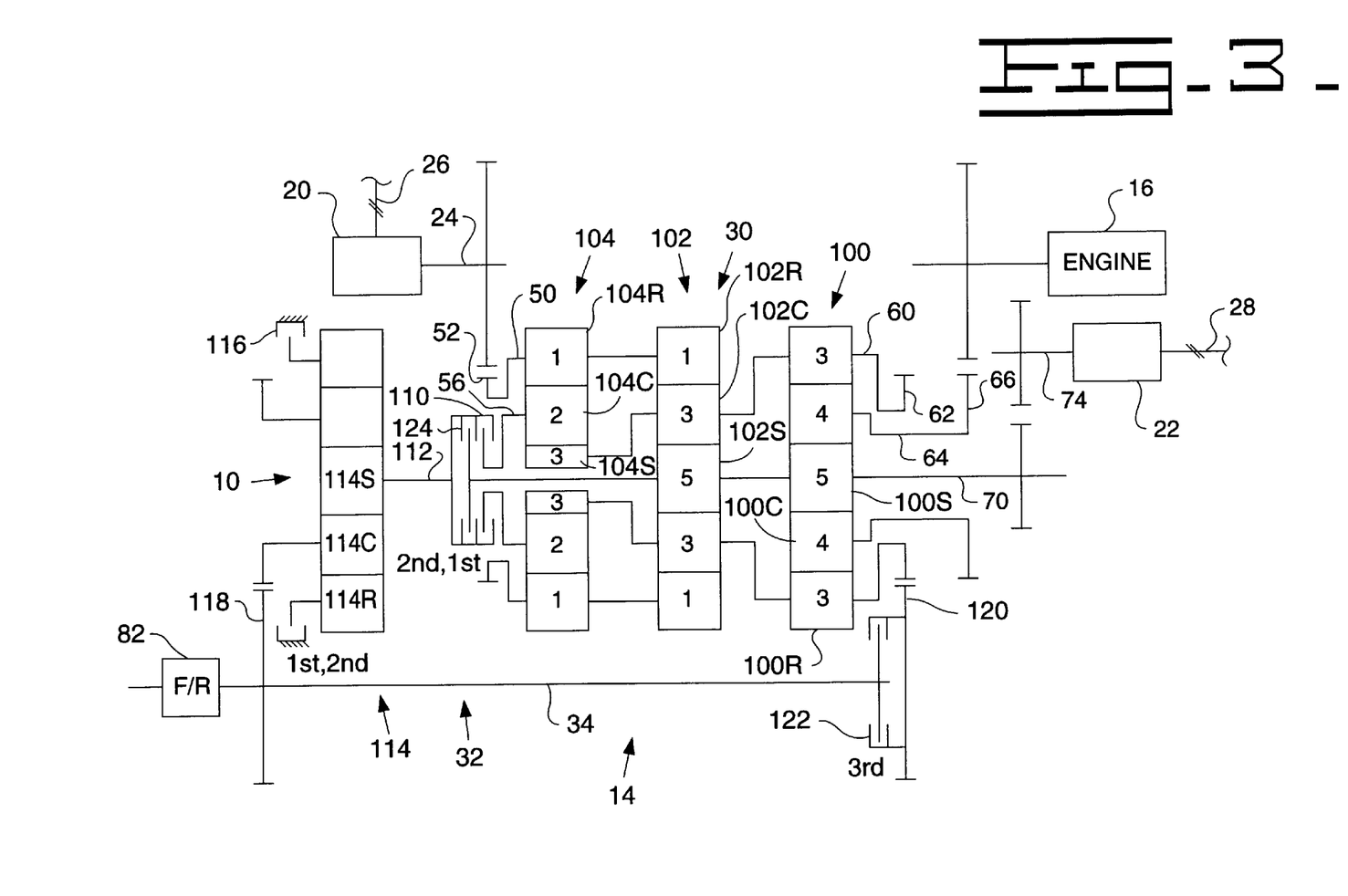
FIG. 3 is a schematic view of an alternate transmission arrangement.

Referring to FIG. 3, the first member 50 includes the ring gears 102R,104R and is connected to the first motor/generator 20. The second member 56 includes the carrier 104C and is selectively connected to the output shaft 34. The third member 60 includes the ring gear 100R, the carrier 102C, the sun gear 104S and is selectively connected to the output shaft 34. The fourth member 64 includes the carrier 100C and is connected to the engine 16. The fifth member 70 includes the sun gears 100S,102S and is connected to the second motor/generator 22 and is also selectively connected to the output shaft 34.

Figure 4:
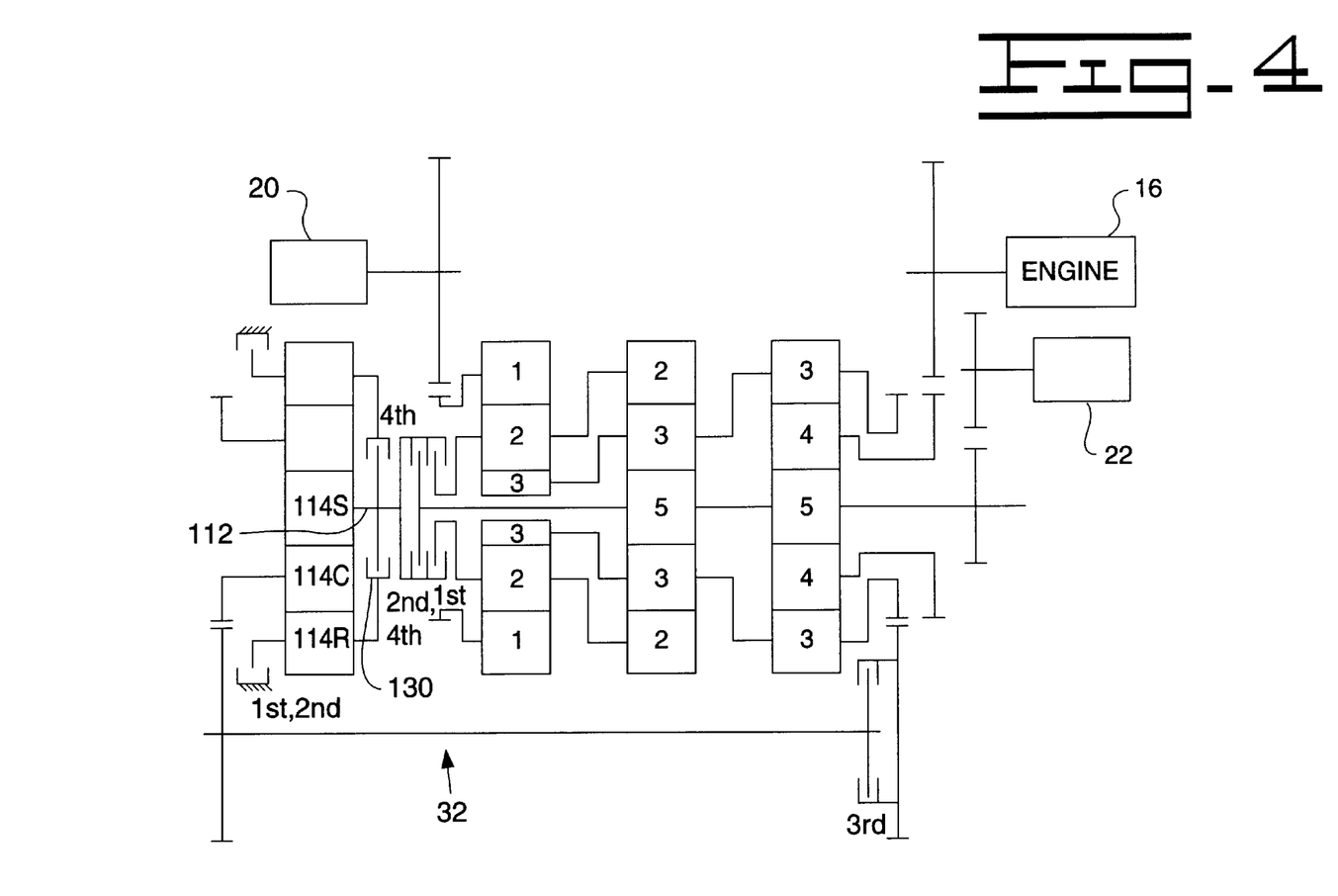
FIG. 4 is a schematic view of an alternate transmission arrangement.

Referring to FIG. 4, the connects are the same as shown in FIG. 3 however a clutch 130 of the gear change mechanism 32 is added to achieve fourth gear ratio. When the clutch 130 is engaged the shaft 112 and sun gear 114S are locked to the ring gear 114R.

Figure 5:
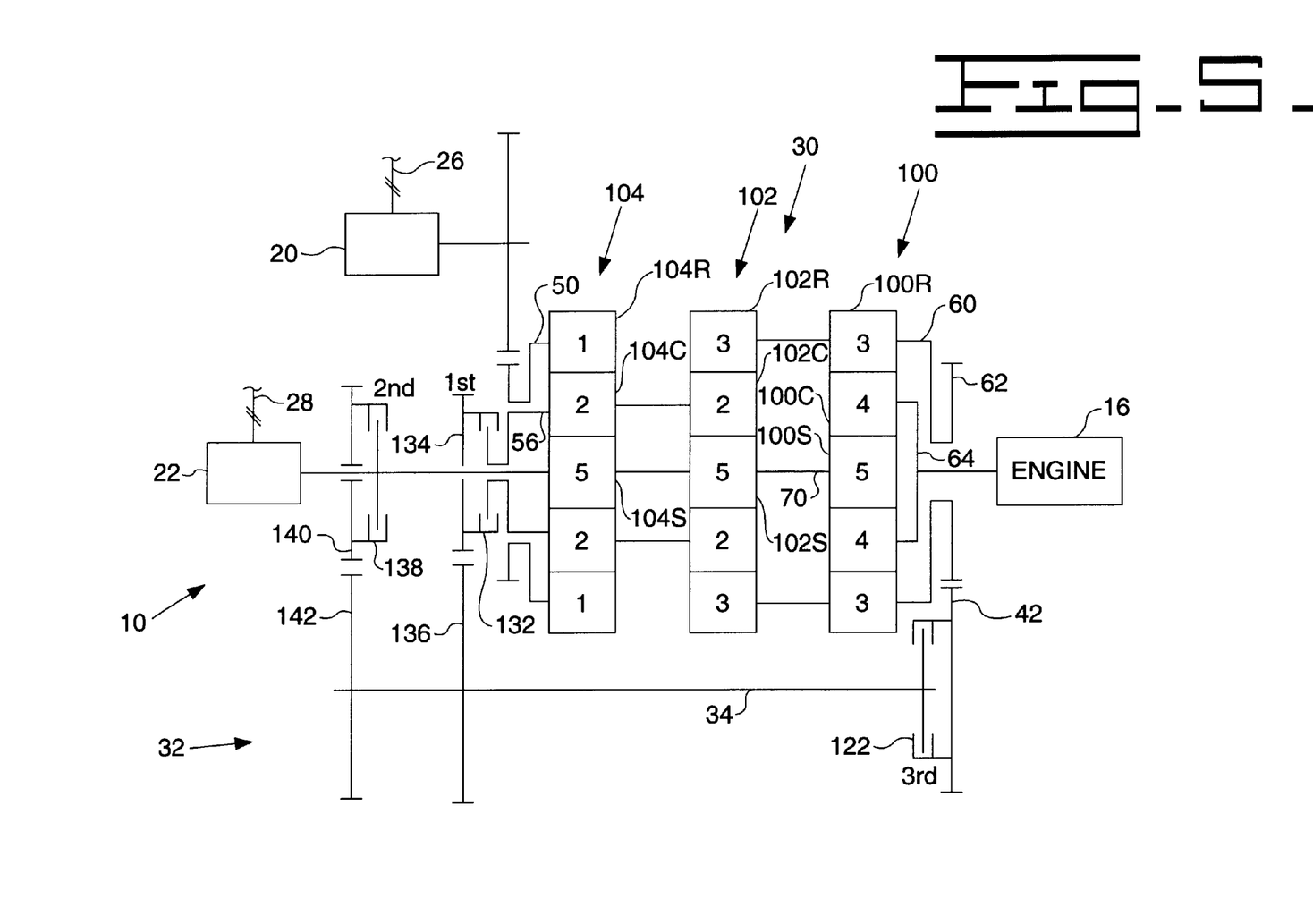
FIG. 5 is a schematic view of an alternate transmission arrangement.

Referring to FIG. 5, the first member 50 includes the ring gear 104R and is connected to the first motor/generator 20. The second member 56 includes the carriers 102C,104C and is selectively engageable by a clutch 132 to achieve first gear ratio. When the clutch 132 is engaged the second member 56 is connected to the output shaft 34 through a gear 134 and a gear 136. The third member 60 includes the ring gears 100R,102R and is selectively connected to the output shaft 34 by the clutch 122 to achieve third gear ratio. When the clutch 122 is engaged the third member 60 is connected to the output shaft 34 through the gears 42,62. The fourth member 64 includes the carrier 100C and is connected to the engine 16. The fifth member 70 includes the sun gears 100S,102S,104S and is selectively connected to the output shaft by a clutch 138 to achieve third gear ratio. When the clutch 138 is engaged the fifth member is connected to the output shaft through a gear 140 and a gear 142. The fifth is also connected to the second motor/generator 22.

Figure 6:
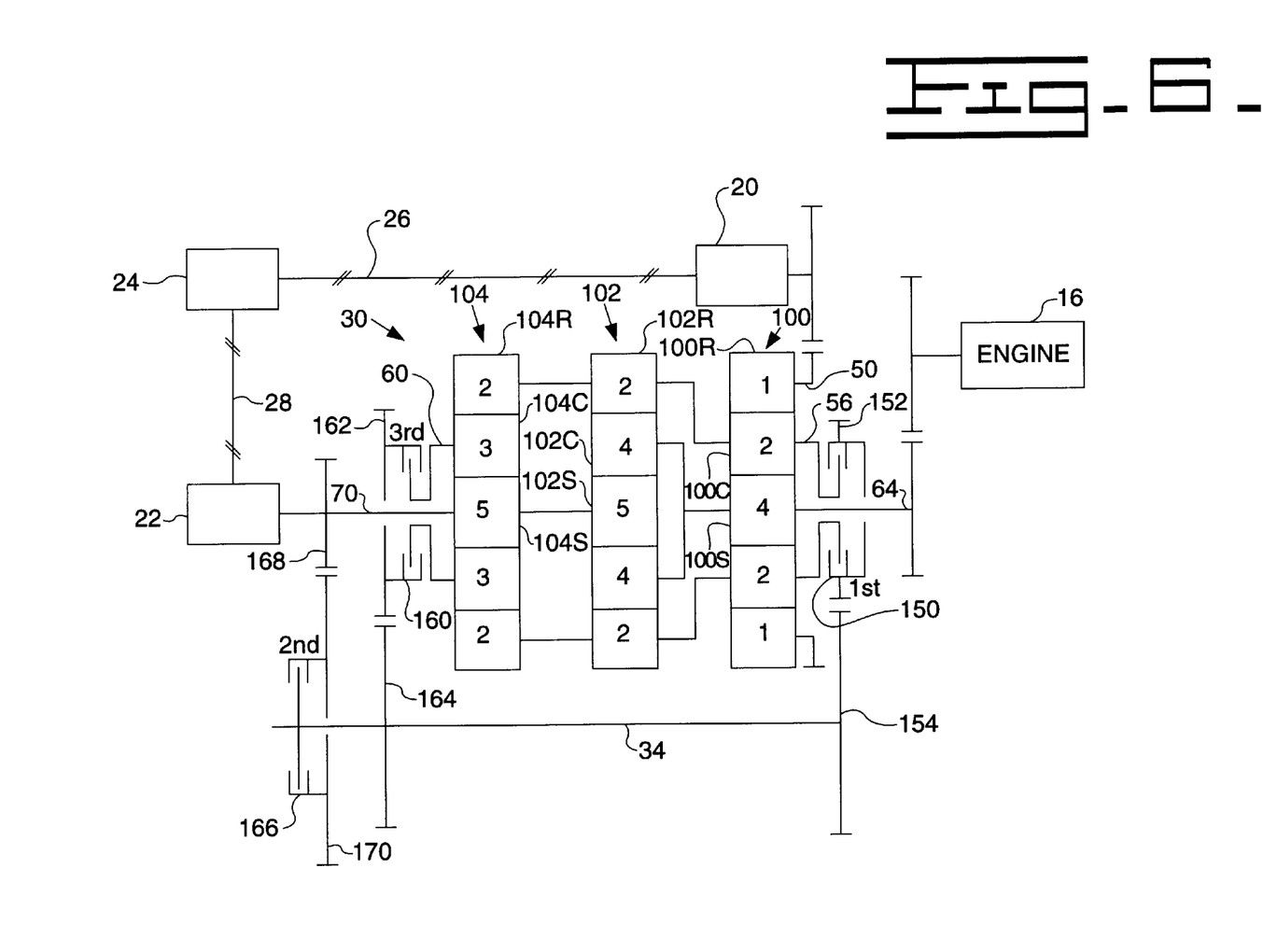
FIG. 6 is a schematic view of an alternate transmission arrangement.

Referring to FIG. 6, the first member 50 includes the ring gear 100R and is connected to the first motor/generator 20. The second member 56 includes the carrier 100C, the ring gears 102R,104R and is selectively connected to the output shaft 34 by a clutch 150 to achieve first gear ratio. When the clutch 150 is engaged the fifth member 90 is connected to the output shaft 34 through a gear 152 and a gear 154. The third member 60 includes the carrier 104C and is selectively connected to the output shaft 34 by a clutch 160 to achieve third gear ratio. When the clutch 160 is engaged the third member 60 is connected to the output shaft 34 through a gear 162 and a gear 164. The fourth member 64 includes the sun gear 100S, the carrier 102C and is connected to the engine 16. The fifth member 70 includes the sun gears 102S,104S and is selectively connected to the output shaft 34 by a clutch 166 achieve second gear ratio. When the clutch 166 is engaged the fifth member 70 is connected to the output shaft 34 through a gear 168 and a gear 170. The fifth member 70 is also connected to the second motor/generator 22.

It is noted that in the configurations of the electo-mechanical transmissions 16 that the engine 16 and the first and second motor/generators 20, 22 could be driven through a gear reduction or directly without a gear reduction without departing from the scope of the invention.

Figure 7:
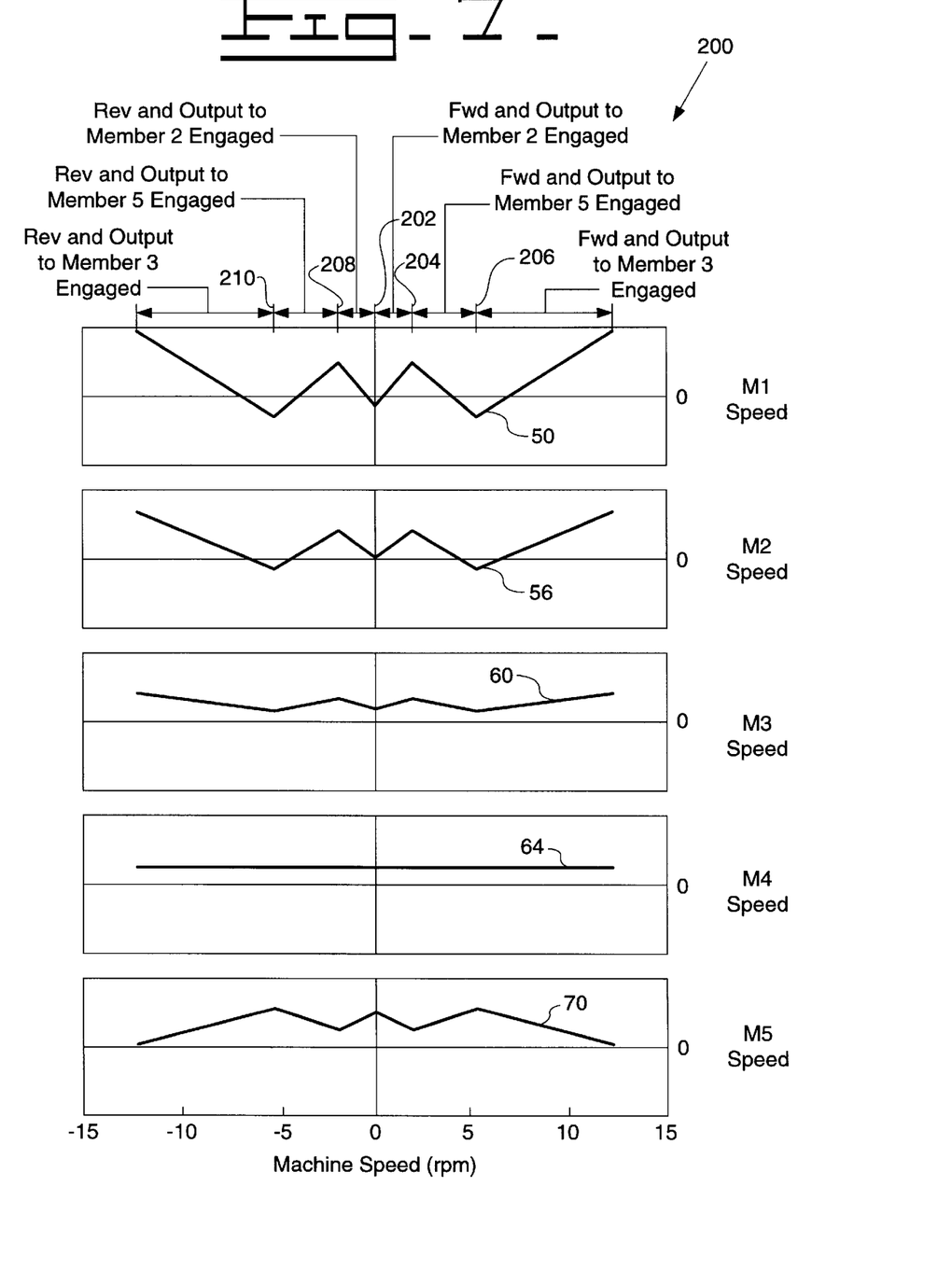
FIG. 7 is a schematic representation of a graph showing changes in the various components relative to machine speed.

Referring to FIG. 7, a graph 200 discloses the changes in the members and associated components as the machine speed increases from a stop until maximum speed is achieved in both forward and reverse direction. The graph 200 shows the changes to the various members with an example of a general connection as shown in FIG. 1. Line 202 represents zero speed at which the clutch 36 is engaged and clutches 38,76 are disengaged and engine 16 and the motors/generators 20,22 maintain the machine at zero speed. From line 202 until line 204 the clutch 36 is engaged, the directional mechanism 82 in the forward direction and the machine increases in speed. At line 204 the clutch 36 is disengaged and the clutch 76 is engaged to shift from the first gear ratio to the second gear ratio. At line 206 the clutch 76 is disengaged and the clutch 36 is engaged to shift from the second gear ratio to the third gear ratio. In the reverse direction the gear ratio will change at lines 208 and 210. A plurality of data lines 50,56,60,64,70 on the graph 100 correspond to reference numerals of the five members. The data lines represent the speed and direction of the various members as the machine speed increases.

INDUSTRIAL APPLICABILITY

In the use of the electro-mechanical transmission 10 of the present invention the electrical section 12 and the mechanical transmission 14 interact to provide a continuously variable and efficient output which enables the engine 16 to operate at its best efficiency.

In operation of the electro-mechanical transmission 10 of FIG. 1, with the engine 16 and member four 64 operating at a constant predetermined speed level the clutch 36 is engaged and clutches 38,76 are disengaged and engine and the motors/generators maintain the machine speed at zero. If the operator elects to move the machine forward, for example, from zero to approximately 2–3 mph, the clutch 36 remains engaged for first gear ratio, the directional mechanism is in the forward direction, the first member 50 and the first motor/generator 20 increases in speed, the second member 56 increases in speed and is connected to the output shaft 34 by the engagement of the clutch 36, the third member 60 increases in speed, the fifth member 70 and the second motor/generator 22 decrease in speed.

At line 204, which approximately 2–3 mph, the clutch 36 is disengaged to disconnect the second member from the output and clutch 76 is engaged, to achieve second gear ratio, and the fifth member is connected to the output. The first member 50 and the first motor/generator 20 decrease in speed, the second member 56 decreases in speed, the third member 60 decreases in speed, the fifth member 70 and the second motor/generator 22 increase in speed.

At line 206, which is approximately 6 mph, the clutch 76 is disengaged to disconnect the fifth member 70 from the output and the clutch 38 is engaged, to achieve third gear ratio, and the third member 60 is connected to the output. The first member 50 and the first motor/generator 20 increase in speed, the second member 56 increases in speed, the third member 60 increases in speed, the fifth member 70 and the second motor/generator 22 decreases in speed. The members 50,56,60 will increase in speed and the member 70 will decrease in speed until the machine has reached its maximum speed.

It is recognized that the above description relates to a three speed ratio electro-mechanical transmission, however more clutches or shift collars could be used to achieve higher gear ratios without departing from the scope of the invention. The speed of the machine can be increased from zero speed to some predetermined maximum speed level at a smooth continuous manner. This is accomplished by the interaction of the motor/generators 20,22 and the mechanical transmission by engaging and disengaging clutches or shift collars.

In the subject arrangement the machine can be operated in reverse through the same gear ratios as set forth above with respect to operating in the forward direction. To operate in reverse the directional mechanism must be changed to the reverse direction.

In view of the forgoing, it is readily apparent that the electro-mechanical transmission of the present invention having five members and three planetary gear sets that will provide a continuously variable transmission.

Other aspects, objects and advantages of this invention can be obtained from a study of the drawings, the disclosure and the appended claims.

We claim:

1. An electro-mechanical transmission having an input and an output, the electro-mechanical transmission comprising:

a first motor/generator;

a second motor/generator;

a planetary gearing mechanism, the planetary gearing mechanism includes a first, a second, a third planetary gear set each having a sun gear, a carrier with planet gears and a ring gear;

a first member of the planetary gearing mechanism connected to one of the motor/generator;

a second member of the planetary gearing mechanism being selectively connected to the output;

a third member of the planetary gearing mechanism being selectively connected to the output;

a fourth member of the planetary gearing mechanism connected to the input;

a fifth member of the planetary mechanism being connected to the other of the motor/generator and selectively connected to the output.

2. The electro-mechanical transmission of claim 1 including a gear change mechanism for connecting the second, the third and the fifth member to the output.

3. The electro-mechanical transmission of claim 1 wherein the first member includes the ring gear of the third planetary gear set, the second member includes the carrier of the first planetary gear set and the ring gear of the second planetary gear set, the third member includes the ring gear of the first planetary gear set, the carrier of the second planetary gear and the sun gear of the third planetary gear set, the fourth member includes the carrier of the first planetary gear set, the fifth member includes the sun gears of the first and second planetary gear sets.

4. The electro-mechanical transmission of claim 3 including a gear change mechanism for selectively connecting the second, the third and the fifth member to the output.

5. The electro-mechanical transmission of claim 1 wherein the first member includes the ring gears of the second and third planetary gear sets, the second member includes the carrier of the third planetary gear set, the third member includes the ring gear of the first planetary gear set, the carrier of the second planetary gear set, the sun gear of the third planetary gear set, the fourth member includes the carrier of the first planetary gear set, the fifth member includes the sun gears of the first and second planetary gear sets.

6. The electro-mechanical transmission of claim 5 includes a clutch which is selectively engaged to achieve fourth gear ratio.

7. The electro-mechanical transmission of claim 1 wherein the first member includes the ring gear of the third planetary gear set, the second member includes the carriers of the second and third planetary gear sets, the third member includes the ring gears of the first and second planetary gear sets, the fourth member includes carrier of the first gear set, the fifth member includes the sun gears of the first, second and third planetary gear sets.

8. The electro-mechanical transmission of claim 2 wherein the first member includes the ring gear of the first planetary gear set, the second member includes the carrier of the first planetary gear set and the ring gears of the second and third planetary gear sets, the third member includes the carrier of the third planetary gear set, the fourth member includes sun of the first planetary gear set and the carrier of the second planetary gear set, the fifth member includes the sun gears of the second and third planetary gear sets.

* * * * *